United States Patent [19]

Hartman et al.

[11] 4,314,879

[45] Feb. 9, 1982

[54] PRODUCTION OF FIELD-REVERSED MIRROR PLASMA WITH A COAXIAL PLASMA GUN

[75] Inventors: Charles W. Hartman, Alamo; James W. Shearer, Livermore, both of Calif.

[73] Assignee: The United States of America as represented by the United States Department of Energy, Washington, D.C.

[21] Appl. No.: 22,894

[22] Filed: Mar. 22, 1979

[51] Int. Cl.³ ............................................. G21B 1/00
[52] U.S. Cl. .................................. 376/128; 376/130; 376/140; 376/107
[58] Field of Search ........................................ 176/3–8, 176/2

[56] References Cited

U.S. PATENT DOCUMENTS

| | | | |
|---|---|---|---|
| 3,617,908 | 11/1971 | Greber | 176/3 |
| 3,626,305 | 12/1971 | Furth | 176/7 |
| 3,664,921 | 5/1972 | Christofilos | 176/4 |

OTHER PUBLICATIONS

LLL-Prop-156, 8/78, Simonen, pp. 1–260.
UCRL-80635, 7/78, Pearlstein et al., pp. 1–10.
UCRL-52170, 11/76, Condit et al., pp. 1–21.
UCID-17691, 12/77, Baldwin et al., pp. 1–21.
The Physics of Fluids, vol. 13, No. 9, pp. 2398–2406, 9/70, Turner.
UCRL-80857, 10/78, Clauser et al., pp. 1–54.
Physics of Fluids, vol. 11, No. 7, 7/68, Jones et al., pp. 1550–1557.
Proc. of Second U.N. Intl. Conf. on Peaceful Uses of Atomic Energy, 1958, vol. 30, pp. 279–290, Christofilos (II).
Proc. of Second U.N. Intl. Conf. on Peaceful Uses of Atomic Energy, vol. 31, pp. 3–5, Alfven.
Astrophysical J., vol. 133, 1961, pp. 1043–1048, Lindberg et al.
Phy. Rev. Lett., vol. 37, No. 22, 11/76, pp. 1468–1471, Logan et al.
Nuclear Fusion, vol. 15, 1975, pp. 1143–1155, Fleischmann et al.
Phy. Rev. Lett., vol. 39, No. 12, 9/77, pp. 744–747, Davis et al.

Primary Examiner—Harvey E. Behrend
Attorney, Agent, or Firm—Thomas E. Hill; Roger S. Gaither; James E. Denny

[57] ABSTRACT

The use of a coaxial plasma gun to produce a plasma ring which is directed into a magnetic field so as to form a field-reversed plasma confined in a magnetic mirror. Plasma thus produced may be used as a target for subsequent neutral beam injection or other similarly produced and projected plasma rings or for direct fusion energy release in a pulsed mode.

11 Claims, 10 Drawing Figures

PRODUCTION OF FIELD-REVERSED MIRROR PLASMA WITH A COAXIAL PLASMA GUN

The invention described herein was made at Lawrence Livermore Laboratory in the course of, or under, Contract W-7405-ENG-48 between the United States Department of Energy and the University of California.

BACKGROUND OF THE INVENTION

The invention relates to the confinement of field-reversed plasma rings produced by a coaxial plasma gun by means of magnetic fields. More particularly this invention relates to the confinement of an accelerated plasma ring by a magnetic mirror.

The magnetic mirror is one approach currently being developed as a future fusion power reactor system. In a mirror system the magnetic field lines enter and leave the confinement chamber at its ends. To prevent end losses the intensity of the field is increased at each end (the mirrors). At the same time the field shape is chosen so as to suppress any tendency of the plasma to escape sideways across the field. The basic concept involved is to produce a magnetic well or a region in space where the plasma particles, trapped in the field lines of the external field, encounter an increasing magnetic field in whatever direction they move. This adiabatic confinement by the magnetic mirror depends on the fact that a particle trapped on and circling about a field line can be thought of as a circular current loop guided by, and in motion along, the field lines. Such a current loop will tend to be repelled from the regions of increasing field, or from the mirror regions. This results in a gyrating motion by the charged particles which are reflected back and forth between the mirror ends.

The simple mirror described above has an inherently low Q (where Q is defined as the ratio of fusion output power to input reaction sustaining power) because ion-ion collisional scattering redirects the ions out through the mirrors. An additional scattering mechanism producing plasma instabilities is the drift cyclotron loss cone (DCLC) mode, the effects of which can be reduced by such techniques as warm plasma stream injection. However, this also reduces the Q-value of the reaction thereby further limiting the commercial feasibility of this approach.

In contrast to the simple mirror approach is the field-reversed mirror (FRM) approach. In the FRM reaction some of the inner magnetic field lines close back on themselves thus creating a region in which plasma ions and electrons are more efficiently trapped. The comparatively rapid angular scattering processes described in the preceding paragraph are not as important in the FRM where the dominant loss process is cross-field diffusion, a much slower process. Substantial increases in attainable Q-value have been predicted for this configuration, e.g., Q-values of up to 5 or more. See Lawrence Livermore Laboratory (LLL) reports UCRL-52170 (1976) and UCRL-52407 (1978) available from the Technical Information Department, Lawrence Livermore Laboratory, Livermore, Calif. 94550.

Recent magnetic mirror experiments have led to unprecedented high values of $\beta$ (the ratio of plasma pressure to maximum magnetic field pressure) where $$\beta = 8\pi \frac{n\overline{E_i}}{B_{vac}^2}$$

with
- n = plasma density
- $\overline{E_i}$ = mean ion energy
- $B_{vac}$ = vacuum magnetic field strength Values of $\beta$ greater than unity are reported by B. G. Logan, et al., Phys. Rev. Lett., 37, 1468 (1976). With these increasing $\beta$ values, improvements in the field reversal factor, $\Delta B/B$, which is defined as the change in field strength at the plasma center $\Delta B$ divided by the vacuum field strength B, have also been observed. Field reversal factors as large as 0.9, with values greater than 1.0 representing field reversal at the center of the magnetic mirror cell and values of 2.0 representing total field reversal with the plasma's magnetic field equal in magnitude, but opposite in direction to the applied magnetic field, are reported in Lawrence Livermore Laboratory UCRL-80857 (1978). However, with $\Delta B/B<1$ it can be concluded that in these experiments no closed field lines were produced. These experimental results are compared with theory in LLL preprint report UCRL-80635.

The prior art contains various approaches to achieve field reversal. The more prominent and pertinent approaches include the Astron scheme, field reversed ion rings formed by cusp injection, field reversed theta pinch, and the adiabatic compression of plasma gun injected vortices. Each of these individual approaches is considered in the following paragraphs.

The relativistic electron beam (Astron) approach, as first described by N. C. Christofilos, Proc. of Second United Nations Intl. Conf. on Peaceful Uses of Atomic Energy (United Nations, Geneva, Switzerland, 1958), Vol. 32, 279, involves producing and sustaining field reversal by bulk plasma diamagnetic currents generated by a layer of multi-MeV electrons. This approach is the subject of U.S. Pat. No. 3,664,921. It is to be noted here that in this set of experiments the interior magnetic field was produced by an auxiliary group of particles, namely the relativistic circulating electrons, rather than particles in the main plasma. This confining current was produced by a relativistic electron beam. The magnetic field confinement of this relativistic electron beam proved extremely difficult, which resulted in these experiments being of limited success. Later, Fleischmann et al. utilized this approach by injecting 500 kiloelectron volt, 10 kiloampere electron beams into a magnetic mirror of the Astron geometry to achieve field reversal by producing closed field lines with field reversal factors of up to 1.2 in the mirror's center and lifetimes of up to 20 microseconds. See Fleischmann et al., Phys. Rev. Lett., 29, 256 (1972). Christofilos and Fleischmann both concluded that, although field reversal had been achieved with relativistic electrons, a net power reactor application was unlikely due to excessive synchrotron radiation losses by the electron ring. In addition, these relativistic electron beams have not yet been shown to be able to coexist with a low density, high temperature plasma.

Another approach is described by H. H. Fleischmann and T. Kammash, Nuclear Fusion, 15, 1143 (1975), involving the trapping in an externally applied magnetic field of a field-reversing ring of several hundred MeV protons or deuterons. This scheme envisions the production of the field-reversing rings via the adiabatic compression of low energy (10–20 MeV) ion rings which could be generated by conventional accelerators. However, significant questions regarding the feasibility of this approach were left unanswered by the authors, leaving this approach still to be experimentally verified. These unresolved issues included the gross stability of the projected ion rings thus produced, the interaction of the plasma currents generated along the magnetic field lines with the fast-ion ring and the overall energy efficiency of the ring-producing ion diodes.

The reversed field theta pinch is produced by shock ionization and heating of a gas by a rapidly rising solenoidal magnetic field. If this magnetic field is then rapidly reversed in direction, the trapped flux inside the plasma is now oppositely directed to the applied field, thus producing the field-reversed configuration following reconnection of the magnetic flux lines at the ends of the solenoidal-shaped plasma. While this approach utilizes the diamagnetic currents in the plasma itself to produce field-reversal, it is subject to the rapid growth of rotational instabilities which limit its duration to approximately 30 microseconds. The source of this rotational instability is currently the subject of extensive investigative research, as it has resulted in various questions regarding the commercial feasibility of a net power reactor based upon this pulsed power approach. However, the theta pinch technique, when implemented with a conical plasma gun, has shown that the drifting collection of ions approach to achieve field reversal is feasible. From these results, it is concluded that the drifting ion technique will also be successful in achieving field reversal in a magnetic mirror.

In addition to the aforementioned efforts to achieve field reversal, extensive work in the study of the stability of plasma rings projected into and captured by a magnetic field has been performed. H. Alfven, Proc. of the Second United Nations Intl. Conf. on the Peaceful Uses of Atomic Energy (United Nations, Geneva, Switzerland, 1958), Vol. b 31, 3, and L. Lindberg and C. Jacobsen, Astrophysical Journal, 133, 1043 (1961), describe experiments and the underlying theory in this area. Here a radial magnetic field is produced between a magnetic pole inside a coaxial plasma gun's inner electrode an an annular pole of opposite polarity outside the gun's outer electrode. It was found that the moving plasma ring carries the magnetic field's lines of force with it provided it has a sufficiently high conductivity and density. Upon proceeding further, the plasma ring stretches the lines of force and finally breaks them so that a free plasma ring is produced which moves on. No attempt was made here to confine the ring either in a magnetic mirror or other magnetic well. One would expect the ring-shaped plasma passing the static magnetic field at the gun's muzzle to conserve the magnetic flux through the central electrode of the gun as a poloidal flux through the center of the plasma ring. However, it was observed that the moving ring's poloidal flux was several times larger than the static flux. It was concluded that the increased magnetic flux was due to an instability of the pinched current path in the plasma such that the azimuthal flux in the plasma, initially set up by the discharge current, was transformed into a poloidal flux. These experiments, however, did not utilize a magnetic guide field in the plasma gun tube, nor was a magnetic mirror present for plasma confinement.

In addition, the coaxial plasma gun was employed in a relatively low efficiency mode, resulting in the production of very low temperature plasmas with low electrical efficiency.

In summary, successful reversal of the plasma-confining magnetic field has been achieved with relativistic electron beams and by the theta pinch approach. But the relativistic electron beam approach suffers from excessive synchrotron radiation losses while the straight theta pinch technique is plagued by plasma break-up due to rotational instability. While the conical theta pinch technique has successfully produced moving field-reversed rings, this approach suffers from low energy efficiency. The present invention, however, makes use of an extremely efficient energy coupling scheme between the high energy plasma generator and the externally imposed magnetic field which results in the conservation of the plasma's confining magnetic flux and facilitates achieving field reversal in a magnetic mirror confined plasma.

SUMMARY OF THE INVENTION

The present invention provides a method for producing a field-reversed mirror plasma by generating and projecting a plasma ring by means of a coaxial plasma gun into an equilibrium magnetic field aligned parallel to the direction of the plasma ring's motion. The plasma ring is allowed to drift into the minimum B-field of a magnetic mirror where it is confined.

One object of the present invention is to provide a process for confining a stable field-reversed plasma wherein a field-reversed plasma ring produced by a coaxial plasma gun is compressed by its motion through an equilibrium magnetic field of increasing strength and confined in a magnetic mirror the strength of which may be rapidly controlled by means of gating circuitry to permit entry into and confinement by the magnetic mirror.

Another object of the present invention is to provide a process for confining a stable field-reversed plasma wherein a field-reversed plasma ring produced by a coaxial plasma gun and compressed by its motion through an equilibrium magnetic field of increasing strength is accelerated by the coaxial gun such that its kinetic energy density exceeds the local energy density of a magnetic mirror field into which the ring is projected and its resulting loss in kinetic energy results in the ring's confinement in the magnetic mirror.

Still another object of the present invention is to provide a process for confining a stable field-reversed plasma wherein two field-reversed plasma rings produced and accelerated along a common axis in opposite directions by two coaxial plasma guns penetrate into and collide within a magnetic mirror resulting in a cancellation of ring kinetic energies and plasma stagnation within the mirror.

Still another object of the present invention is to provide a process for sustaining a field-reversed mirror plasma by means of injecting a field-reversed plasma ring produced by a coaxial plasma gun with sufficient kinetic energy to penetrate the magnetic mirror and collide with the field-reversed mirror plasma so as to increase the resistively decaying plasma current thus supplementing the confinement of the fusing plasma.

Other objects and advantages of the invention will become apparent from the following drawings and detailed description of the present invention.

BRIEF DESCRIPTION OF THE DRAWINGS

The invention will be described in greater detail by reference to the drawings in which.

While the invention will be described in connection with a preferred procedure, it will be understood that it is not intended to limit the invention to that procedure. On the contrary, it is intended to cover all alternatives, modifications and equivalents as may be included within the spirit and scope of the invention as defined by the appended claims.

DESCRIPTION OF PREFERRED EMBODIMENTS

Magnetic mirror systems are used in magnetic fusion energy research to confine the charged particles of a dense plasma by means of an externally applied magnetic field. By confining a plasma comprised of appropriate nuclear fusion reactants having a high kinetic energy and fueling and heating this plasma with additional energetic nuclear fusion reactant particles, nuclear fusion reactions may be initiated and sustained. The end result of a magnetic mirror nuclear device is the production of heat, power, energetic nuclear particles and the use of such particles for promoting nuclear reactions and, ultimately, the direct conversion of the energy derived from the nuclear fusion reaction into electrical energy.

The key elements in the field-reversed mirror (FRM) reaction are startup, magneto-hydrodynamic (MHD) stability, and plasma confinement. The fully-reversed state wherein $\Delta B/B = 2.0$ corresponds to a field at the plasma center equal in magnitude and opposite in direction to the applied field is estimated to require about three times the injected sustaining neutral beam current or three times improvement of plasma confinement over that achieved in the 2XIIB magnetic mirror experiments at Lawrence Livermore Laboratory. See LLL report UCID-17691 (1977). The present invention avoids meeting these stringent requirements by using a fast pulsed method to create an initially field-reversed target with trapped poloidal flux roughly equal to the desired final state flux, trapping the target plasma in a magnetic mirror and sustaining the plasma by neutral beam injection.

Figure 1:
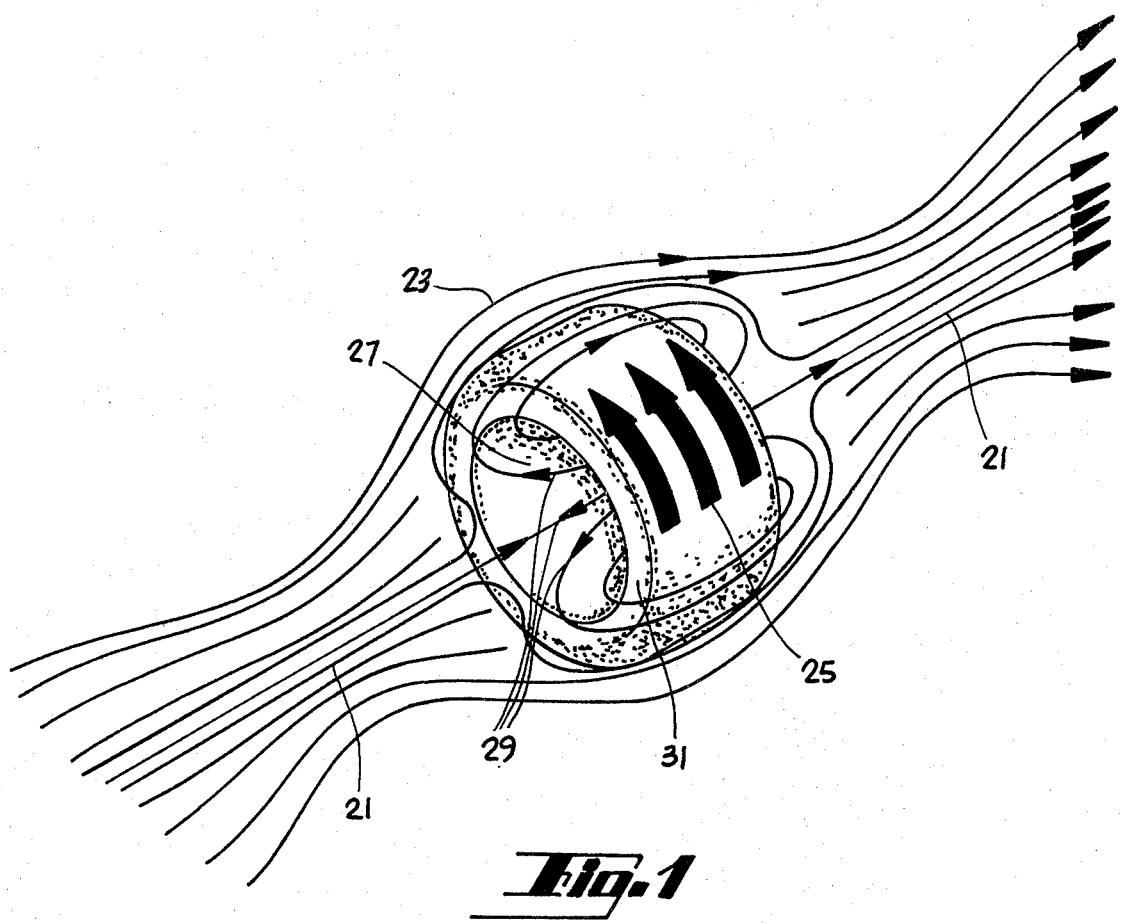
FIG. 1 is a perspective view of the field-reversed mirror plasma state.

The magnetic mirror system is used to confine and compress the energetic plasma, both radially and axially, thereby increasing its density and also raising its temperature. This magnetic well is capable of confining plasmas with such a high $\beta$-value that the magnetic field within the plasma is depressed almost to zero. This magnetic well is capable of confining a field-reversed plasma without regard to the manner in which it is produced. This is shown in FIG. 1 where the mirror effect is created by the stronger magnetic lines at the ends 21 than in the central plasma region 23. Internal plasma currents 25 create a magnetic field-reversed internal region 27 between the mirrors 21. This self-generated magnetic field 29 further confines the internally-trapped plasma 31, making it even more difficult for diffusion to take place across the closed field lines 29 within the FRM to the magnetic field lines that escape through the mirrors 21.

Figure 2:
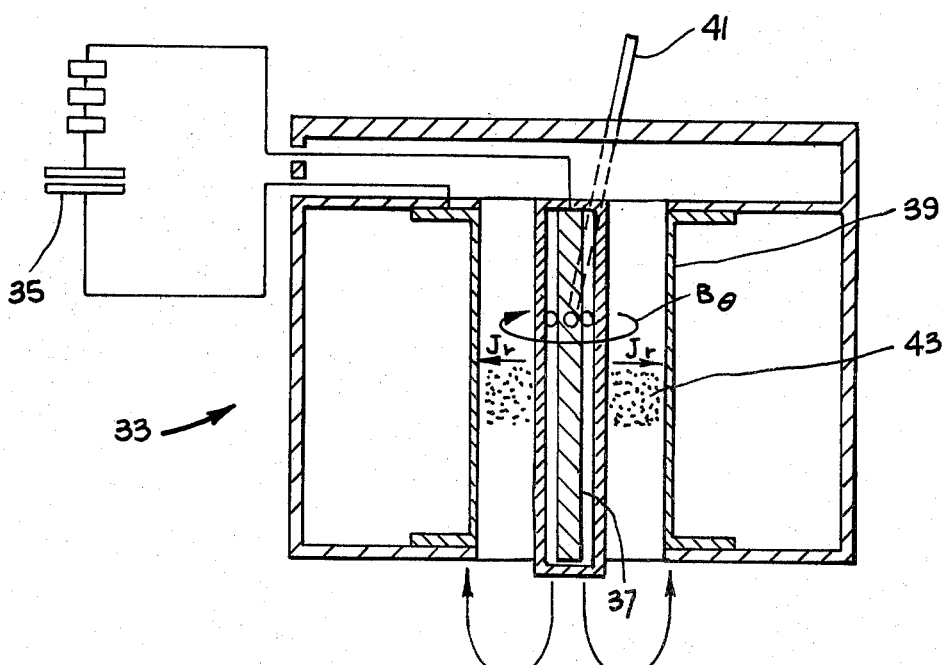
FIG. 2 is a generalized schematic of a coaxial plasma gun used for producing and accelerating plasma rings.

The present invention involves the production of the FRM plasma condition by confining a moving plasma ring in a magnetic mirror. The plasma ring is produced and accelerated by means of a coaxial plasma gun as shown in FIG. 2. Operation of the coaxial plasma gun 33, or accelerator, involves applying a high voltage from a capacitor bank 35 across the inner 37 and outer 39 coaxial-cylindrical electrodes of the plasma gun 33. In the present invention deuterium gas is admitted through a fast gas valve-duct combination 41 symmetrically into the space between the inner 37 and outer 39 coaxial electrodes. An electric field is then applied from the capacitor bank 35 across the electrodes, and an avalanche breakdown occurs which produces a radial current sheet, $\vec{j}_r$. This current sheet is connected to the bank by surface currents flowing along the coaxial conductors 37 and 39. These currents establish the azimuthal, or toroidal, magnetic field, $\vec{B}_\theta$. The resulting force on the plasma, $\vec{j}_r \times \vec{B}_\theta$, accelerates the plasma in the axial direction. This accelerating force may also be viewed as the magnetic pressure of the induction due to the driving currents, $B^2_\theta/2\mu_o$, where $\mu_o$ is the permeability of vacuum. This pressure pushes against the conducting plasma 43 and accelerates it down the electrodes. The total current is distributed over the total discharge volume and is ejected from the gun together with the plasma. It is to be noted that the plasma ring is formed in an essentially field-free region which, however, is encircled by the poloidal magnetic flux.

A high energy coaxial plasma gun capable of generating and propelling the energetic plasma needed to initiate the FRM reaction has recently been developed at Los Alamos Scientific Laboratory (LASL). This device is capable of propelling the plasma ring out of its muzzle in a 1.5 micro-second burst approximately 8 microseconds after the capacitor bank fires. Experimental time of flight data indicates a fast plasma component with a velocity in the $3.2 \times 10^7$ centimeters/second to $8.9 \times 10^7$ centimeters/second range. The mean velocity of the fast component is approximately $5.4 \times 10^7$ centimeters/second corresponding to a hydrogen ion (D+) energy, E, of 3.0 kilo-electronvolts. The perpendicular component of total plasma energy and the total plasma energy itself are given by the integrated diamagnetic loop data and calorimeter data which are summarized in Tables 1 and 2. A representative number for the perpendicular energy of the fast component is $W_\perp = 5$ kilojoules, and for total energy of the fast component $W = W_\perp + W_\parallel = 35$ kilo-joules.

TABLE 1

| DISTANCE FROM GUN (cm) | AREA (cm²) | TRANSVERSE ENERGY (kJ) |
| --- | --- | --- |
| 60 | 130 | 8.7 |
| 150 | 70 | 6.5 |

TABLE 1-continued

| DISTANCE FROM GUN (cm) | AREA (cm²) | TRANSVERSE ENERGY (kJ) |
|---|---|---|
| 220 | 45 | 4.8 |

MAX. VELOCITY = $9 \times 10^7$ cm/s

TABLE 2

PLASMA ENERGY PENETRATING $B_z$ FIELD:
    COIL: 50 cm LONG, 23 cm DIAMETER
           PLACED 40 cm FROM GUN MUZZLE
MODE 1 OPERATION:
    165 kJ WITH CALORIMETER 30 cm
    FROM GUN (NO COIL)
    50 kJ BEHIND COIL WITH $B_z = 0$
    35 kJ BEHIND COIL WITH $B_z = 10$ kG
    20 kJ BEHIND COIL WITH $B_z$ 17 kG

PLASMA DOES NOT STRIKE WALLS WITH $B_z > 10$ kG

The number of fast ions is estimated to be $N = W/E = 7.3 \times 10^{19}$ D+ ions, or about 3% of the total 50 cubic centimeters atmosphere of gas puffed into the gun. This number of particles is approximately an order of magnitude more than the number of energetic particles needed for the required neutral beam target to achieve field reversal. More details regarding plasma gun performance parameters needed and presently available for practicing the present invention can be found in Appendix C of Lawrence Livermore Laboratory Proposal, LLL-Prop-156, "Plasma Gun Proposal", of Aug. 18, 1978, available from the Technical Information Department, Lawrence Livermore Laboratory, Livermore, Calif. 94550. See also Tables 1, 2 and 3.

Figure 3A:
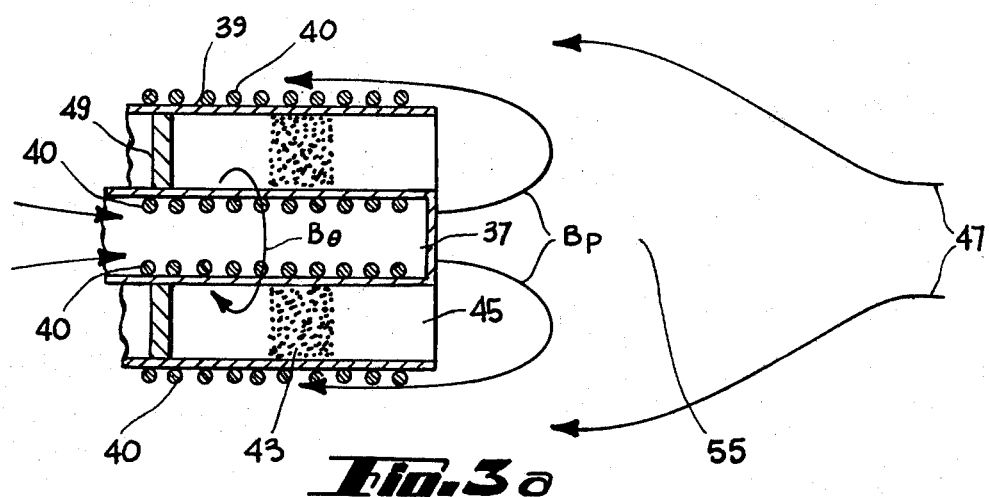
FIGS. 3a-c is an illustration of the sequential formation of a field-reversed plasma ring generated by injecting a coaxial plasma gun-produced plasma ring into an equilibrium magnetic field.
Figure 3B:
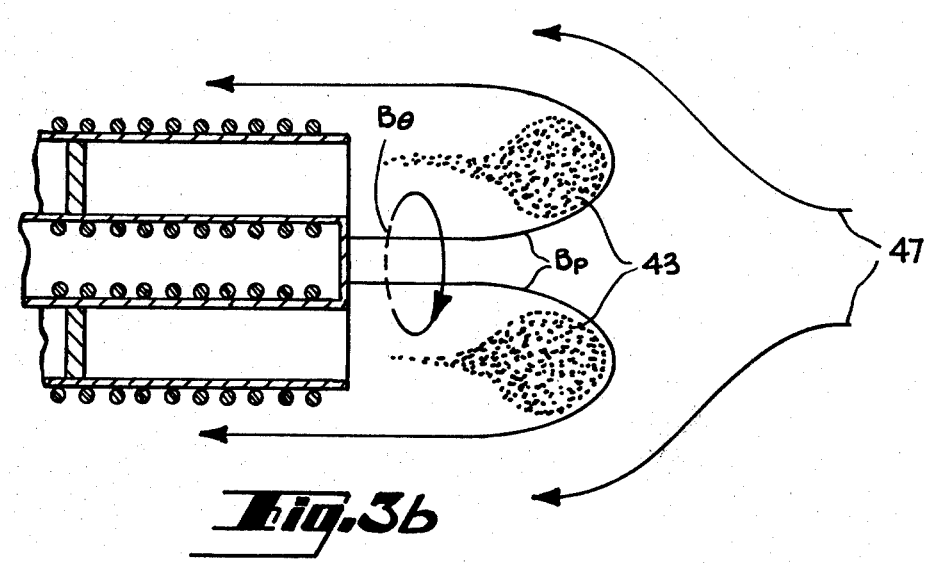
Figure 3C:
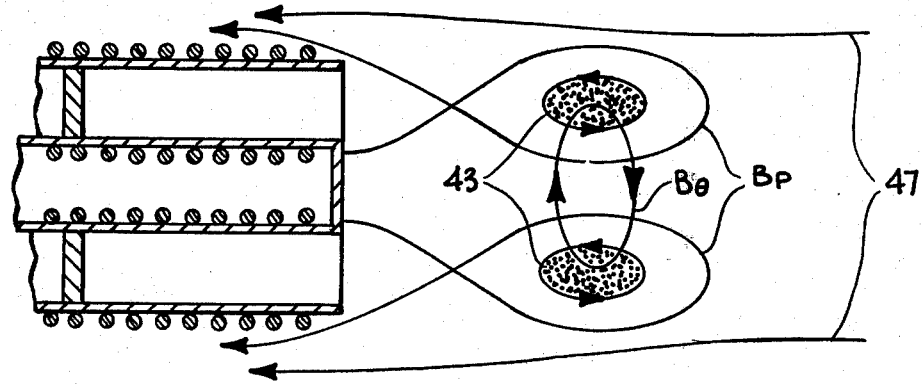

The effects of superimposing an external equilibrium magnetic field on the moving plasma ring produced by a coaxial gun is shown in FIG. 3. The plasma ring 43, initially generated in a region free of, but inside, the gun's radial or poloidal magnetic field $B_p$, is accelerated into this field as shown in FIG. 3(a). After the plasma leaves the muzzle of the coaxial plasma gun 45, it pushes the radial magnetic field out ahead of it, as shown in FIG. 3(b). Eventually, the radial field becomes so elongated that it separates from the gun thus creating a discontinuity between the center electrode 37 and the moving plasma ring 43 which may be described as a field-reversed ring (FRR) of plasma which is free to coast along the externally-imposed equilibrium magnetic field 47, as shown in FIG. 3(c). The FRR possesses a magnetic flux having a very long persistence which is maintained by an azimuthal current within the plasma which is an excellent electrical conductor. This azimuthal current is independent of the gun's condenser current and is increased by the increase in magnetic flux as the FRR moves through the poloidal field of the coaxial plasma gun. The FRR will continue to move through the equilibrium magnetic field 47 by virtue of its kinetic energy. Ring compression can be enhanced by increasing the strength of the equilibrium field along the direction of FRR motion. As shown in FIG. 3(c), eventually the poloidal field becomes so elongated as the FRR moves away from the plasma gun that it tears, leaving the FRR free to coast along the equilibrium magnetic field 47. By fitting the inner 37 and outer 39 electrodes with high magnetic field solenoids 40, and immersing the plasma gun in an equilibrium magnetic guide field, a magnetic cusp 55 is formed in front of the gun. By this arrangement magnetic flux is excluded from the region between electrodes. Thus, until the plasma leaves the gun's muzzle 45, it is not acted upon by an external magnetic field. The plasma gas, deuterium or deuterium-tritium mixture, is puffed into the region between the electrodes at a distance halfway between the breach 49 and muzzle 45. High $\beta$ plasma reaching the end of the gun pushes the field lines out until eventually they become highly elongated and reconnect behind the high $\beta$ ring so that the drifting FRR is formed. Cold, low $\beta$ plasma continuing to flow from the gun is prevented from coming into contact with the ring by the cusp field which diverts this plasma to the region outside the outer electrode 39.

Figure 4A:
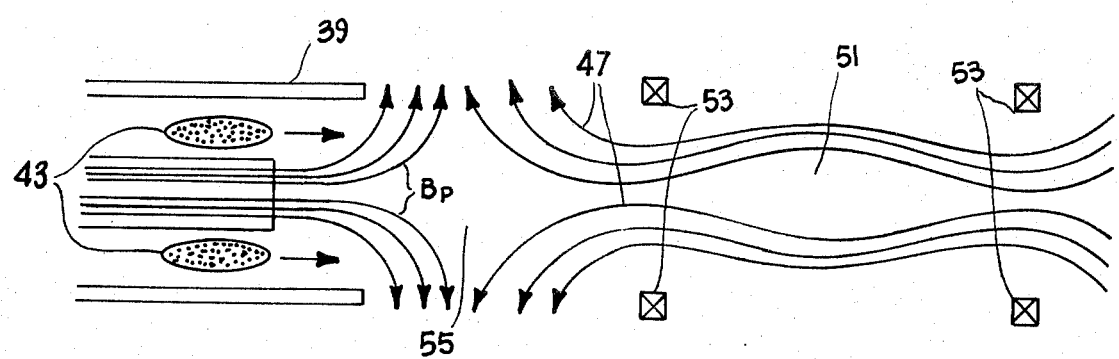
FIGS. 4a-c is an illustration of the injection of a field-reversed plasma ring by a coaxial plasma gun into a magnetic mirror in which the plasma ring is confined.
Figure 4B:
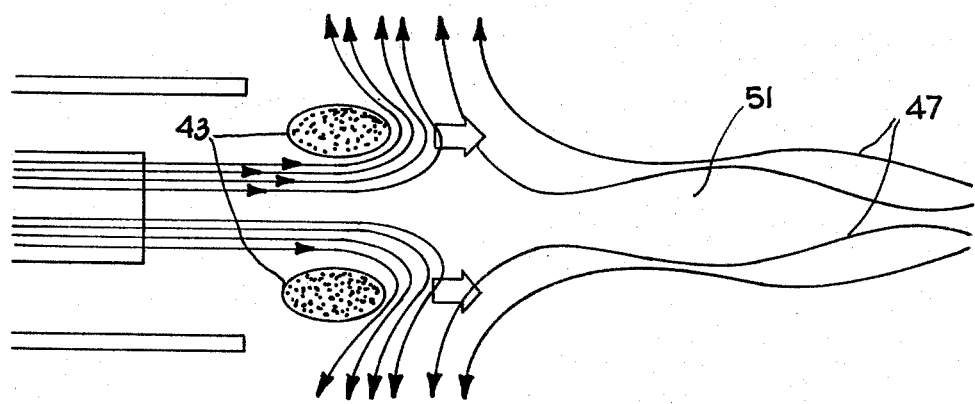
Figure 4C:
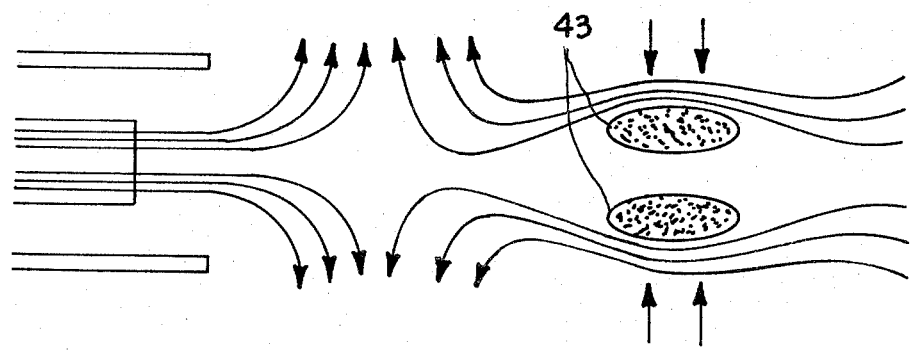
Figure 5A:
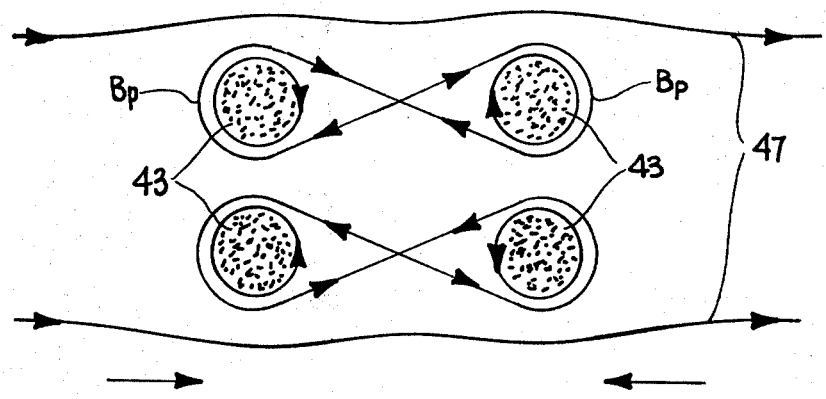
FIGS. 5a-b is an illustration of a process for confining a field-reversed ring in which two coaxial plasma gun-produced, field-reversed rings are projected along a common axis in opposite directions and allowed to collide in the cancellation of ring momentum and the trapping of a single field-reversed ring.
Figure 5B:
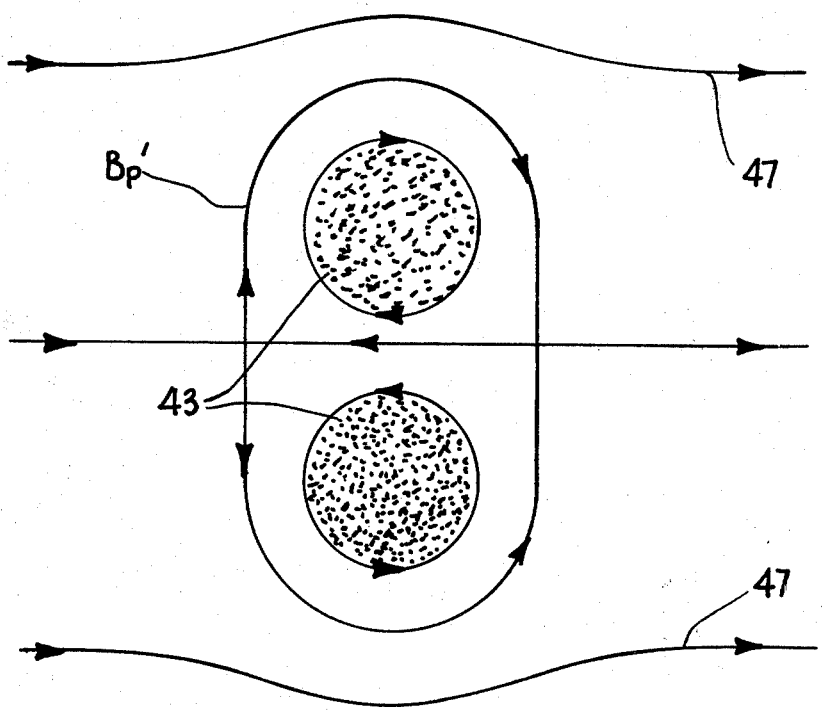

Following production and acceleration of the FRR it is then confined in a magnetic mirror where it is sustained by energetic neutral particle beams 57 as shown in FIGS. 4(a) through 4(c). In FIG. 4(a) the FRR is shown leaving the plasma gun 33 in a direction opposite to that of the equilibrium magnetic field 47. This geometry, however, is not a requisite for successful system operation, for this approach is operable if all B-field directions are reversed. Imposed on this magnetic field is the magnetic mirror 51 produced by two dc mirror coils 53. The reflection of the moving FRR 43 by the strong magnetic mirror can be avoided by gating the ring through the dc mirror by a pulsed field which approximately cancels the dc mirror. This technique whereby a moving plasma ring is confined in a minimum B-field magnetic mirror has been successfully used by W. B. Jones and R. D. Miller, Physics of Fluids, 11, 1550 (1968). Table 3 provides detailed operating parameters and performance criteria for the embodiment described herein. Another approach to FRR confinement is shown in FIG. 5 wherein two FRR's 43 are projected along a common axis in opposite directions. The two FRR's are made to collide resulting in the cancellation of plasma momentum and the trapping of the single FRR. This approach represents a significant departure from the more traditional methods of trapping a single FRR such as (1) the previously discussed gating of the magnetic mirror field, or (2) resistive layer confinement, as in the Astron device. The resultant FRR shown in FIG. 5 will possess a diamagnetic current greater than the value of the individual FRR currents prior to the merger.

Thus, it is apparent that there has been provided, in accordance with the invention, a process for producing a field-reversed mirror plasma with a coaxial plasma gun that fully satisfies the objects, aims, and advantages set forth above. While the invention has been described in conjunction with specific embodiments thereof, it is evident that many alternatives, modifications and variations will be apparent to those skilled in the art. It is intended to embrace all such alternatives, modifications, and variations as fall within the spirit and broad scope of the appended claims.

TABLE 3
Field Reversed Target and Neutral Beam Heated Plasma Ring Parameters.

| Parameter | | Initial State Target Plasma | Final State Neutral Beam Heated Plasma |
|---|---|---|---|
| $B_O$ | (Applied Vacuum Field) | 5.0 kG | 5.0 kG |
| $T_i$ | (Target Ion Temp.) | 2.5 keV | 6.7 keV |
| $T_e$ | (Target Electron Temp.) | >640 eV | >180 eV |
| $\rho_i$ | (Gyro-orbit Radius) | 2.0 cm | 3.3 cm |
| a | (Plasma Minor Radius) | 4.7 cm | 4.0 cm |
| R | (Plasma Major Radius) | 11.7 cm | 10.0 cm |
| 2L | (L = Plasma Half-Length) | 13.6 cm | 50.0 cm |
| $\bar{n}$ | (Plasma Volume Average Density) | $2.7 \times 10^{14}$ cm$^{-3}$ | $1.0 \times 10^{14}$ cm$^{-3}$ |
| $\bar{\beta}$ | (Plasma Press./B-Field Press.) | 1.1 | 1.1 |
| Vol | (Plasma Volume) | 9.4 liters | 25.0 liters |
| N | (Total Number of Particles) | $2.5 \times 10^{18}$ | $2.5 \times 10^{18}$ |
| $W_{ring}$ | (Total Plasma Ion K.E.) | 1.5 kJ | 4.0 kJ |
| $\tau$ | (Plasma Target Lifetime) | >2.6 ms | >1.0 ms |
| $I_{beam}$ | (Beam Injection Current) | — | 400 amps |
| $V_{beam}$ | (Beam Voltage) | — | 18 kV |

What we claim is:

1. A method of producing a field-reversed mirror plasma, comprising the steps of:
producing a minimum B magnetic field of multi-Tesla strength in an evacuated plasma confinement apparatus by means of a magnetic mirror;
generating a plasma ring by means of a coaxial plasma gun, said coaxial plasma gun possessing a solenoidal conductor configuration so as to produce a poloidal magnetic field, the inner component of said poloidal field being in a direction opposite to that of the magnetic field of the mirror so as to form a magnetic field-reversed configuration around the gun;
accelerating the plasma ring by means of said coaxial plasma gun so that the plasma ring drifts out of and away from the coaxial plasma gun in a direction parallel to the coaxial plasma gun's longitudinal axis and toward said magnetic mirror, thus forming a field-reversed plasma ring upon reconnection of the magnetic field lines between said plasma ring and said coaxial plasma gun; and
confining the field-reversed plasma ring in the minimum B magnetic well of the magnetic mirror thereby producing a field-reversed mirror plasma.

2. A method as recited in claim 1, wherein deuterium gas is used to produce the field-reversed ring by means of the coaxial plasma gun.

3. A method as recited in claim 1, wherein a deuterium-tritium gas mixture is used to produce the field-reversed ring by means of the coaxial plasma gun.

4. A method as recited in claim 1, wherein confinement of the moving field-reversed plasma ring is accomplished by the rapid gating of the minimum B field of the magnetic mirror.

5. A method as recited in claim 1, wherein an external pulsed magnetic field is superimposed upon and cancels the magnetic field at one end of the magnetic mirror along the axis of the moving plasma ring to permit the penetration and confinement of the plasma ring in the magnetic mirror.

6. A method as recited in claim 1, wherein the field-reversed mirror plasma is sustained by introducing an energetic neutral species of particles by means of a neutral beam source so as to maintain a higher density and temperature of the confined field-reversed plasma.

7. An apparatus for the production and confinement of a field-reversed mirror plasma, the apparatus comprising:
an evacuated plasma confinement chamber;
a magnetic mirror capable of producing a minimum B magnetic field of multi-tesla strength in the plasma confinement chamber;
a coaxial plasma gun for generating and accelerating a plasma ring into the minimum B magnetic field of said magnetic mirror, said coaxial plasma gun possessing a solenoidal conductor configuration so as to produce a poloidal magnetic field, the inner component of said poloidal field being in a direction opposite to that of the magnetic field of the mirror so as to form a magnetic field-reversed configuration around the plasma gun; and
means for confining the moving field-reversed plasma ring thus formed in the minimum B magnetic well of the magnetic mirror.

8. An apparatus for producing and confining a field-reversed mirror plasma as in claim 7, wherein the coaxial plasma gun produces a field-reversed plasma ring of deuterium ions.

9. An apparatus for producing and confining a field-reversed mirror plasma as in claim 7, wherein the coaxial plasma gun produces a field-reversed plasma ring of deuterium and tritium ions.

10. An apparatus for producing and confining a field-reversed mirror plasma as in claim 7, wherein the means for confining the moving field-reversed plasma ring in the magnetic mirror is by superimposing an external pulsed magnetic field upon the magnetic field at one end of the magnetic mirror along the axis of motion of the moving plasma ring, resulting in the cancellation of the mirror's magnetic field, and permitting the penetration and confinement of the plasma ring in the magnetic mirror.

11. An apparatus for producing and confining a field-reversed mirror plasma as in claim 7, further including means for generating and introducing an energetic neutral species of particles into the confined plasma so as to maintain a higher density and temperature of the confined field-reversed plasma.

* * * * *